US008851492B2

(12) United States Patent
Andreasen et al.

(10) Patent No.: US 8,851,492 B2
(45) Date of Patent: Oct. 7, 2014

(54) MECHANICAL STOP FOR AXLE/SUSPENSION SYSTEMS

(71) Applicant: Hendrickson USA, L.L.C., Itasca, IL (US)

(72) Inventors: Jacob Andreasen, Akron, OH (US); R. Scott Fulton, Hudson, OH (US); John E. Ramsey, Canton, OH (US); Ryan J. Lippincott, Minerva, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 14/158,062

(22) Filed: Jan. 17, 2014

(65) Prior Publication Data

US 2014/0197612 A1     Jul. 17, 2014

Related U.S. Application Data

(60) Provisional application No. 61/753,689, filed on Jan. 17, 2013.

(51) Int. Cl.
*B62D 61/12*     (2006.01)
*B60G 99/00*     (2010.01)

(52) U.S. Cl.
CPC .................................. *B60G 99/002* (2013.01)
USPC ............. 280/124.157; 280/86.5; 280/124.116

(58) Field of Classification Search
USPC ........... 280/124.116, 86.5, 124.157, 124.128, 280/124.153, 124.164
See application file for complete search history.

(56) References Cited

U.S. PATENT DOCUMENTS

| 3,502,348 | A | * | 3/1970 | Bellamy et al. | 280/86.75 |
| 3,771,812 | A | * | 11/1973 | Pierce et al. | 280/86.5 |
| 3,801,209 | A | | 4/1974 | Matsuoka | |
| 4,082,305 | A | * | 4/1978 | Allison et al. | 280/81.1 |
| 4,300,787 | A | * | 11/1981 | Vandenberg | 280/86.5 |
| 4,489,548 | A | * | 12/1984 | Derman | 59/79.1 |
| 4,763,953 | A | * | 8/1988 | Chalin | 298/17 S |
| 5,171,036 | A | | 12/1992 | Ross | |
| 5,879,016 | A | | 3/1999 | Altherr et al. | |
| 6,003,885 | A | * | 12/1999 | Richardson | 280/86.5 |
| 6,439,587 | B2 | * | 8/2002 | Fabris | 280/124.11 |
| 6,598,538 | B2 | * | 7/2003 | Semple et al. | 105/215.2 |

(Continued)

FOREIGN PATENT DOCUMENTS

FR          2835897 A1     2/2002

OTHER PUBLICATIONS

"Air-Beam Drive Axle Air Suspension from Neway" Lear Siegler Truck Products Corp., No official date but prior to Jan. 17, 2014.

*Primary Examiner* — Drew Brown
(74) *Attorney, Agent, or Firm* — Dureska, Kennedy & Moore, L.L.C.; David P. Dureska; Joseph A. Svarovsky

(57) ABSTRACT

An axle/suspension system for heavy-duty vehicles having a frame and at least one suspension assembly operatively connected to the frame, the axle/suspension system including a mechanical stop having a plurality of links and a first end and a second end, the second end rigidly attached to the suspension assembly and the first end rigidly attached to the vehicle frame, wherein the first end and the second end control a distance between the first end and the second end, and control the plurality of links to attain a movement tolerance range of said mechanical stop from about 0.0 inches to about 2.0 inches.

23 Claims, 10 Drawing Sheets

(56) References Cited

U.S. PATENT DOCUMENTS

| | | | |
|---|---|---|---|
| 6,752,406 B2 * | 6/2004 | Pierce et al. | 280/86.5 |
| 7,267,348 B1 * | 9/2007 | Klein et al. | 280/124.128 |
| 8,459,666 B2 * | 6/2013 | Piehl et al. | 280/86.5 |
| 2007/0222169 A1 * | 9/2007 | Smith et al. | 280/124.157 |
| 2012/0061887 A1 | 3/2012 | Westnedge et al. | |
| 2014/0060126 A1 * | 3/2014 | Stevens | 70/18 |

\* cited by examiner

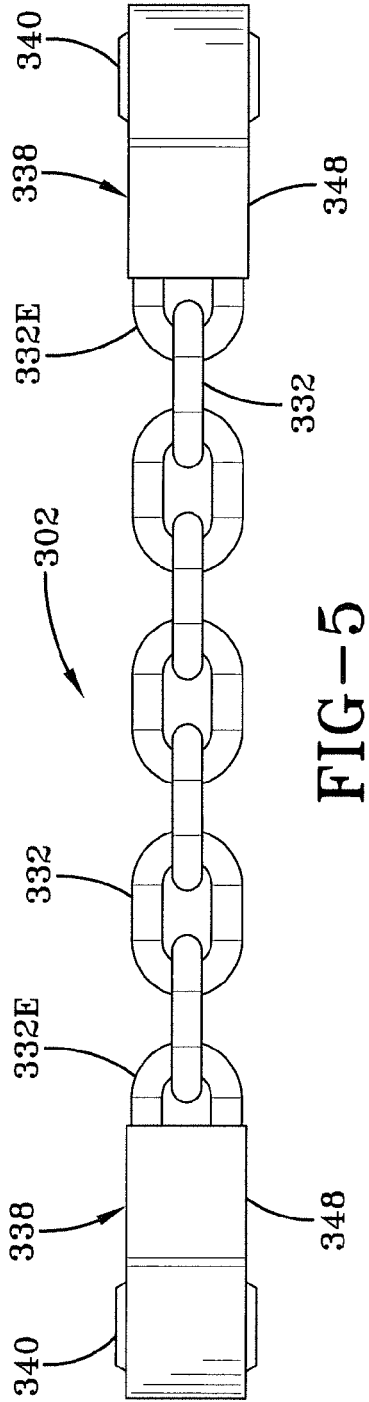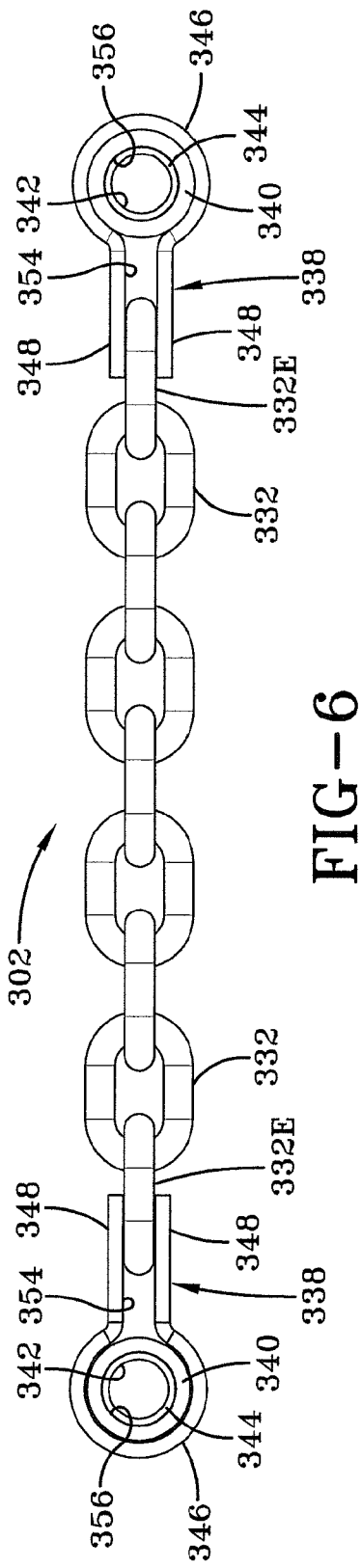

MECHANICAL STOP FOR AXLE/SUSPENSION SYSTEMS

CROSS-REFERENCE TO RELATED APPLICATIONS

This application claims the benefit of U.S. Provisional Patent Application Ser. No. 61/753,689, filed Jan. 17, 2013, and U.S. Provisional Patent Application Serial No. 61/805,364, filed on Mar. 26, 2013.

BACKGROUND OF THE INVENTION

1. Field of the Invention

The invention relates generally to the art of axle/suspension systems for heavy-duty vehicles. More particularly, the invention relates to air-ride axle/suspension systems for heavy-duty vehicles which utilize an air spring to cushion the ride of the vehicle. More specifically, the invention relates to a mechanical stop for use with an axle/suspension system that utilizes an air spring with damping characteristics that is lightweight and limits the downward movement of the beam of the axle/suspension system to minimize potential damage to the air spring and the axle/suspension system during operation of the vehicle.

2. Background Art

The use of air-ride trailing and leading arm rigid beam-type axle/suspension systems has been very popular in the heavy-duty truck and tractor-trailer industry for many years. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members which form the frame of the vehicle. More specifically, each beam is pivotally connected at one of its ends to a hanger which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The beam end opposite the pivotal connection end also is connected to an air spring, or its equivalent, which in turn is connected to a respective one of the main members. A height control valve is mounted on the main member or other support structure and is operatively connected to the beam and to the air spring in order to maintain the ride height of the vehicle. A brake system and one or more shock absorbers for providing damping to the axle/suspension system of the vehicle also are mounted on the axle/suspension system. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle.

The axle/suspension systems of the heavy-duty vehicle act to cushion the ride, dampen vibrations and stabilize the vehicle. More particularly, as the vehicle is traveling over the road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental effect of these forces on the vehicle as it is operating, the axle/suspension system is designed to react and/or absorb at least some of them.

These forces include vertical forces caused by vertical movement of the wheels as they encounter certain road conditions, fore-aft forces caused by acceleration and deceleration of the vehicle, and side-load and torsional forces associated with transverse vehicle movement, such as turning of the vehicle and lane-change maneuvers. In order to address such disparate forces, axle/suspension systems have differing structural requirements. More particularly, it is desirable for an axle/suspension system to be fairly stiff in order to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system. It is also desirable to dampen the vibrations or oscillations that result from such forces. A key component of the axle/suspension system that cushions the ride of the vehicle from vertical impacts is the air spring, while a shock absorber typically provides damping characteristics to the axle/suspension system.

The amount of cargo that a vehicle may carry is governed by local, state, and/or national road and bridge laws. The basic principle behind most road and bridge laws is to limit the maximum load that a vehicle may carry, as well as to limit the maximum load that can be supported by individual axles. Because shock absorbers are relatively heavy, these components add undesirable weight to the axle/suspension system and therefore reduce the amount of cargo that can be carried by the heavy-duty vehicle. Depending on the shock absorbers employed, they also add varying degrees of complexity to the axle/suspension system which is also undesirable.

A pair of prior art shock absorbers of the type utilized in heavy-duty air-ride axle/suspension systems each generally include a cylinder and a piston rod reciprocating within the cylinder, although a single shock absorber has been utilized and is well known in the art. The cylinder is filled with an operating fluid, such as gas or oil, such that the operating fluid is moved by a piston valve secured to one end of the piston rod to generate a damping force.

Each one of the prior art shock absorbers is mounted on and extends between the beam of a respective one of the suspension assemblies of the axle/suspension system and a respective one of the main members of the vehicle or other component fixed to the main member, such as the hanger. Prior art shock absorbers add complexity and weight to the axle/suspension system. Moreover, because prior art shock absorbers are a service item of the axle/suspension system that require maintenance and/or replacement from time to time, they also add additional maintenance and/or replacement costs to the axle/suspension system.

Prior art shock absorbers, while providing damping characteristics, also limit the downward movement of the beam of the axle/suspension system minimizing the possibility of damage to the air spring and to the axle/suspension system. For example, when a trailer is lifted onto a railroad car, the prior art shock absorber limits downward movement of the beam of the axle/suspension system, which if not limited could potentially result in damage to the air spring and axle/suspension system. In an alternate application, the prior art shock absorber prevents the beam of the axle/suspension system from overextending downwardly when the trailer is being reversed. In this scenario, the trailer brakes are actuated and cause the axle/suspension system to extend downwardly, called "reverse braking" in the art. In another application, the axle/suspension system suddenly drops, or moves downwardly, as a result of a pothole, or other obstacle. The prior art shock absorber serves as a stop to limit the downward movement of the beam of the axle/suspension system. The limited movement of the beam of the axle/suspension system minimizes the possibility of potential damage to the air spring and axle/suspension system.

In super heavy-duty vehicles, a pair of chains are utilized to augment prior art shock absorbers to minimize the possible damage to the prior art shock absorbers as a result of such events that cause downward movement of the beam of the axle/suspension system. The prior art shock absorber and chain limit the downward movement of the beam of the axle/suspension system and thus minimize the possibility of potential damage to the air spring and the axle/suspension system.

Some axle/suspension systems, such as the one described in U.S. Pat. No. 8,540,222 owned by the same assignee of the present invention, Hendrickson USA, L.L.C., include an air spring with damping characteristics. As described in the assignee's patent, the damping shock absorber can be eliminated thus reducing complexity, saving weight and cost, and allowing the heavy-duty vehicle to haul more cargo.

The elimination of the prior art shock absorber may potentially lead to issues with downward movement of the axle/suspension system, as described previously. More specifically, the air spring and/or the axle/suspension system may be potentially damaged if the beam of the axle/suspension system overextends downwardly as a result of the trailer being lifted onto a railroad car, "reverse braking", and/or if the trailer encounters a pot hole or other obstacle.

As set forth above, in those applications where the shock absorber has been eliminated, a need exists in the art for a mechanical stop to limit downward movement of the axle/suspension system to minimize potential damage to the air spring and/or the axle/suspension system.

The mechanical stop for axle/suspension systems of the present invention solves the problems associated with prior art axle/suspension systems that have eliminated the need for a shock absorber, by providing an apparatus for limiting the downward movement of the axle/suspension system. The mechanical stop for axle/suspension systems of the present invention includes a chain, with a plurality of links, and at least one elastomeric bushing at each end of the chain, to generally limit the downward movement of the beam of the axle/suspension system to minimize potential damage to the air spring and the axle/suspension system during operation of the vehicle.

SUMMARY OF THE INVENTION

Objectives of the present invention include providing a mechanical stop for axle/suspension systems that limit downward movement of axle/suspension systems that have eliminated the need for a shock absorber.

A further objective of the present invention is to provide a mechanical stop for axle/suspension systems that generally limits the downward movement of the beam of the axle/suspension system to minimize potential damage to the air spring and the axle/suspension system.

These objectives and advantages are obtained by the mechanical stop of the present invention that includes an axle/suspension system for a heavy-duty vehicle having a frame and at least one suspension assembly operatively connected to the frame, the axle/suspension system including a mechanical stop having a plurality of links and a first end and a second end, the second end rigidly attached to the suspension assembly and the first end rigidly attached to the vehicle frame, wherein the first end and the second end control a distance between the first end and the second end, and control the plurality of links to include a movement tolerance range of from about 0.0 inches to about 2.0 inches.

BRIEF DESCRIPTION OF THE SEVERAL VIEWS OF THE DRAWINGS

The preferred embodiments of the present invention, illustrative of the best mode in which applicants have contemplated applying the principles, are set forth in the following description and are shown in the drawings, and are particularly and distinctly pointed out and set forth in the appended claims.

FIG. 5 is a top plan view of the first preferred embodiment mechanical stop of the present invention shown in FIG. 4;

FIG. 6 is a side plan view of the first preferred embodiment mechanical stop of the present invention shown in FIG. 4;

Similar numerals refer to similar parts throughout the drawings.

DESCRIPTION OF THE PREFERRED EMBODIMENT

Figure 1:
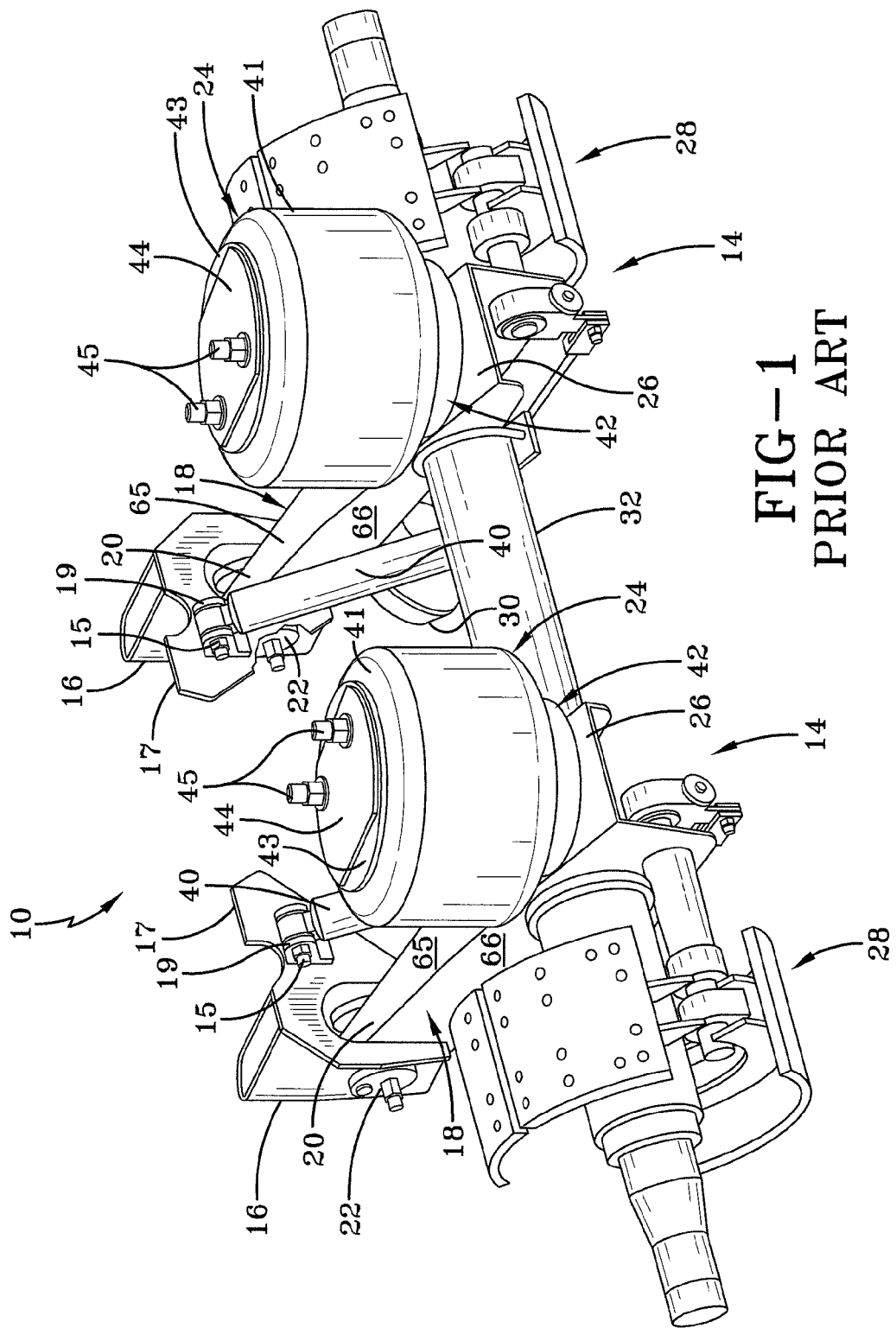
FIG. 1 is a top rear perspective view of an axle/suspension system incorporating a pair of prior art air springs, and showing a pair of shock absorbers, with each one of the pair of shock absorbers mounted on a respective one of the suspension assemblies of the axle/suspension system.

In order to better understand the environment in which the mechanical stop for axle/suspension systems of the present invention is utilized, a trailing arm overslung beam-type air-ride axle/suspension system that incorporates a prior art shock absorber 40, is indicated generally at reference numeral 10, is shown in FIG. 1, and now will be described in detail below.

It should be noted that axle/suspension system 10 is typically mounted on a pair of longitudinally-extending spaced-apart main members (not shown) of a heavy-duty vehicle, which is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. Because axle/suspension system 10 generally includes an identical pair of suspension assemblies 14, for sake of clarity only one of the suspension assemblies will be described below.

Suspension assembly 14 is pivotally connected to a hanger 16 via a trailing arm overslung beam 18. More specifically, beam 18 is formed having a generally upside-down integrally formed U-shape with a pair of sidewalls 66 and a top plate 65, with the open portion of the beam facing generally downwardly. A bottom plate (not shown) extends between and is attached to the lowermost ends of sidewalls 66 by any suitable means such as welding to complete the structure of beam 18. Trailing arm overslung beam 18 includes a front end 20 having a bushing assembly 22, which includes a bushing, pivot bolts and washers as are well known in the art, to facilitate pivotal connection of the beam to hanger 16. Beam 18 also includes a rear end 26, which is welded or otherwise rigidly attached to a transversely-extending axle 32.

Suspension assembly 14 also includes an air spring 24, mounted on and extending between beam rear end 26 and the main member (not shown). Air spring 24 includes a bellows 41 and a piston 42. The top portion of bellows 41 is sealingly engaged with a bellows top plate 43. An air spring mounting plate 44 is mounted on top plate 43 by fasteners 45, which are also used to mount the top portion of air spring 24 to the vehicle main member (not shown). Piston 42 is generally cylindrically shaped and has a generally flat bottom plate and top plate (not shown). The bottom portion of bellows 41 is sealingly engaged with piston top plate (not shown). The piston bottom plate rests on beam top plate 65 at beam rear end 26 and is attached thereto in a manner well known to those having skill in the art, such as by bolts or other fasteners (not shown). The piston top plate is formed without openings so that there is no fluid communication between piston 42 and bellows 41. As a result, piston 42 does not generally contribute any appreciable volume to air spring 24, such that it cannot function as a damping air spring. The top end of a shock absorber 40 is mounted on an inboardly extending wing 17 of hanger 16 via a mounting bracket 19 and a fastener 15, in a manner well known in the art. The bottom end of shock absorber 40 is mounted to beam 18 (the mount not shown) in a manner well known to those having skill in the art. For the sake of relative completeness, a brake system 28 including a brake chamber 30 is shown mounted on prior art suspension assembly 14.

Shock absorber 40 limits the downward movement of beam 18 of axle/suspension system 10 during operation of the vehicle, such as when the axle/suspension system suddenly drops as a result of a pothole, or other obstacle. More specifically, shock absorber 40 minimizes the possibility of potential damage to the axle/suspension system 10 and/or air spring 24 by limiting the downward movement of beam 18. In an alternate application, prior art shock absorber 40 limits downward movement of beam 18 of axle/suspension system 10 when "reverse braking" occurs. In another application, such as when the trailer is lifted onto a railroad car, prior art shock absorber 40 prevents beam 18 of axle/suspension system 10 from overextending downwardly, thus minimizing the possibility of damage to air spring 24 and/or the axle/suspension system.

Figure 2:
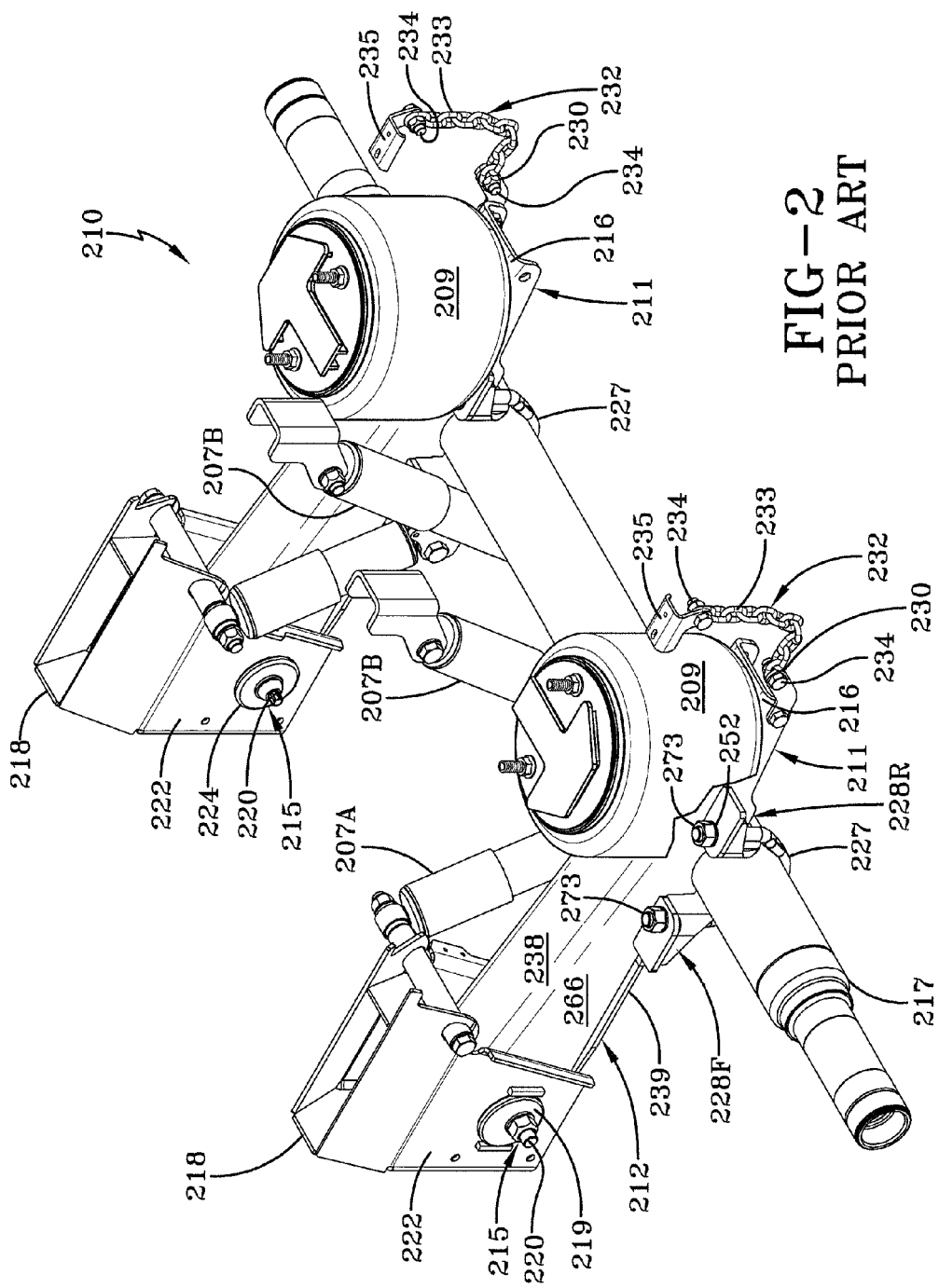
FIG. 2 is a top rear driver-side perspective view of a super heavy-duty axle/suspension system incorporating a pair of prior art air springs, a plurality of prior art shock absorbers and a pair of mechanical stop chains.

Turning now to FIG. 2, alternate pairs of prior art shock absorbers 207A,B are incorporated in an axle/suspension system for a super heavy-duty vehicle (not shown). Axle/suspension system 210 includes an identical pair of suspension assemblies 211 mounted on a pair of transversely spaced hangers 218, with each one of the hangers attached to a respective one of a pair of frame members (not shown) of a super heavy-duty vehicle (not shown). Because suspension assemblies 211 are generally identical to one another, only one of the suspension assemblies will be described below.

Suspension assembly 211 includes a trailing arm or beam 212 which is a generally rigid metal box-like structure including a pair of transversely spaced vertically extending sidewalls 266, which are interconnected by horizontally extending top and bottom plates 238 and 239, respectively. Sidewalls 266 and top plate 238 are formed as a one-piece structure having a generally inverted U-shape. Bottom plate 239 is welded to sidewalls 266 to complete the general structure of beam 212.

A bushing assembly 215 attaches beam 212 to hanger 218 in a manner well known in the art. For sake of completeness, an axle 217 extends between and is rigidly connected to the rear end of each beam 212 by welding and by structural components including a pair of beam U-bolts 227, a front U-bolt bracket/axle seat 228F, a rear U-bolt bracket/axle seat 228R, and their associated hardware. Each one of a pair of washers 252 is disposed over a respective one of the pair of ends of U-bolt 227 and each one of a pair of nuts 273 is threadably engaged with a respective one of the pair of threaded ends of the U-bolt, and tightened to secure axle 217 into an axle locus (not shown) to create a rigid axle-to-beam connection.

Prior art shock absorbers 207A,B, respectively, are each attached to a respective one of beams 212 of suspension assembly 210, in a manner well known to those skilled in the art. Prior art shock absorber 207A is attached to a respective one of hangers 218 in a manner well known to those skilled in the art. Prior art shock absorber 207B is attached to the frame of the vehicle (not shown) in a manner well known to those having skill in the art, to complete the major components of suspension assembly 211.

A platform 216 extends from the rear end of trailing beam 212 for supporting a conventional bellows-type air spring 209, which extends between and is attached to platform 216 and the frame main member of the vehicle. The bottom end of a chain 232 attaches to a bottom mounting bracket 230 of platform 216 via a bolt 234. The top end of chain 232 is connected to a top mounting bracket 235 via bolt 234. Top mounting bracket 235 is attached to the vehicle frame (not shown) via welds or other means of attachment. Chain 232 includes a plurality of links 233, with each respective link having a tolerance of about 0.2 inches to about 0.3 inches, with the overall movement tolerance of the chain being (0.2-0.3)n, where n is the number of links, and provides additional support to first and second shock absorber 207A,B as a result of the generally heavy-loads transported by the trailer utilizing axle/suspension system 210. Chain 232 limits the downward movement of beam 212 of axle/suspension system 210 preventing the overextension of prior art shock absorbers 207A,B, which in turn minimizes the possibility of the shock absorbers and/or axle/suspension system becoming damaged due to overextension.

More particularly, prior art shock absorbers 207A,B, in conjunction with chain 232, limit the downward movement of beam 212 of axle/suspension system 210 during the operation of the vehicle, such as when the axle/suspension system suddenly drops as a result of encountering a pothole, or other obstacle, thereby minimizing the possibility of damage to the axle/suspension system and air spring 209. In an alternate application, prior art shock absorbers 207A,B, and chain 232 limit downward movement of beam 212 of axle/suspension system 210 when "reverse braking" occurs. In another application, such as when the trailer is lifted onto a railroad car, prior art shock absorbers 207A,B and chain 232 prevent beam 212 of axle/suspension system 210 from overextending downwardly, thus minimizing the possibility of damage to air spring 209 and the axle/suspension system.

As set forth above, the introduction of air springs with damping characteristics allowed for elimination of shock absorbers for damping in certain heavy-duty vehicle applications. Despite the fact that mechanical stops have been used in the prior art in super heavy-duty vehicle applications, the elimination of the shock absorber would be problematic in that application because the shock absorbers work in conjunction with the chains to provide damping characteristics to and limit downward movement of the axle/suspension system. Nonetheless, elimination of shock absorbers in an axle/suspension system, such as axle/suspension system 10, created a need in the art for a mechanical stop to replace the shock absorber that is less complex and lighter than a shock absorber, yet prevents overextension of the axle/suspension system during operation of the vehicle.

Therefore, a need exists in the art for an apparatus for an axle/suspension system which can be utilized to replace or augment one or more shock absorbers in order to provide a mechanical stop for limiting the downward movement of beam 18, 212 of axle/suspension system 10, 210 to minimize the possibility of damage to air spring 24, 209 and/or the axle/suspension system. The first and second preferred embodiment mechanical stops for axle/suspension systems for heavy-duty vehicles of the present invention accomplish these needs and the structure and installation of the mechanical stops is described in detail below.

Figure 3:
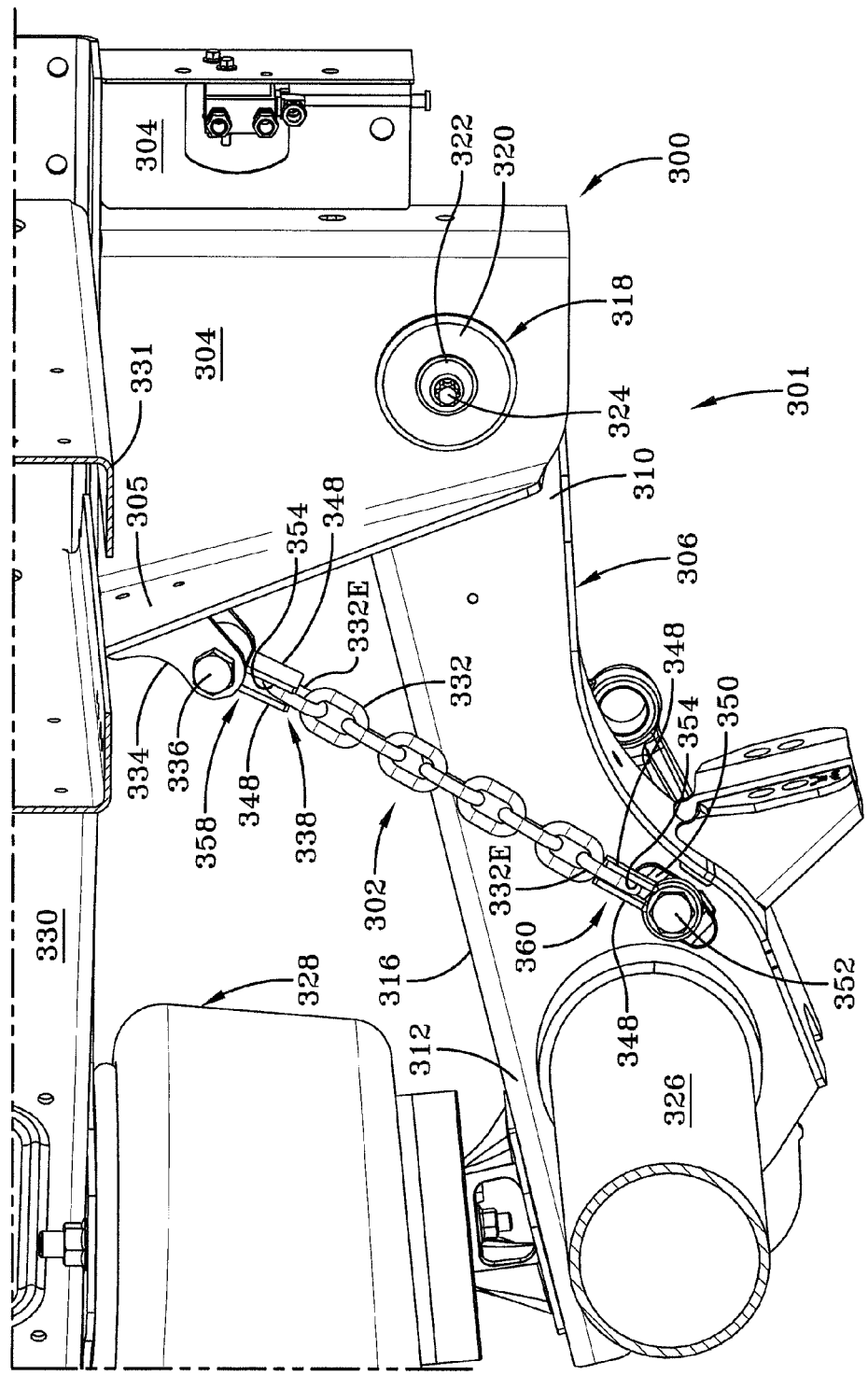
FIG. 3 is a fragmentary perspective view in the outboard direction, of portions of a driver-side suspension assembly of an axle/suspension system incorporating a first preferred embodiment mechanical stop of the present invention.
Figure 4:
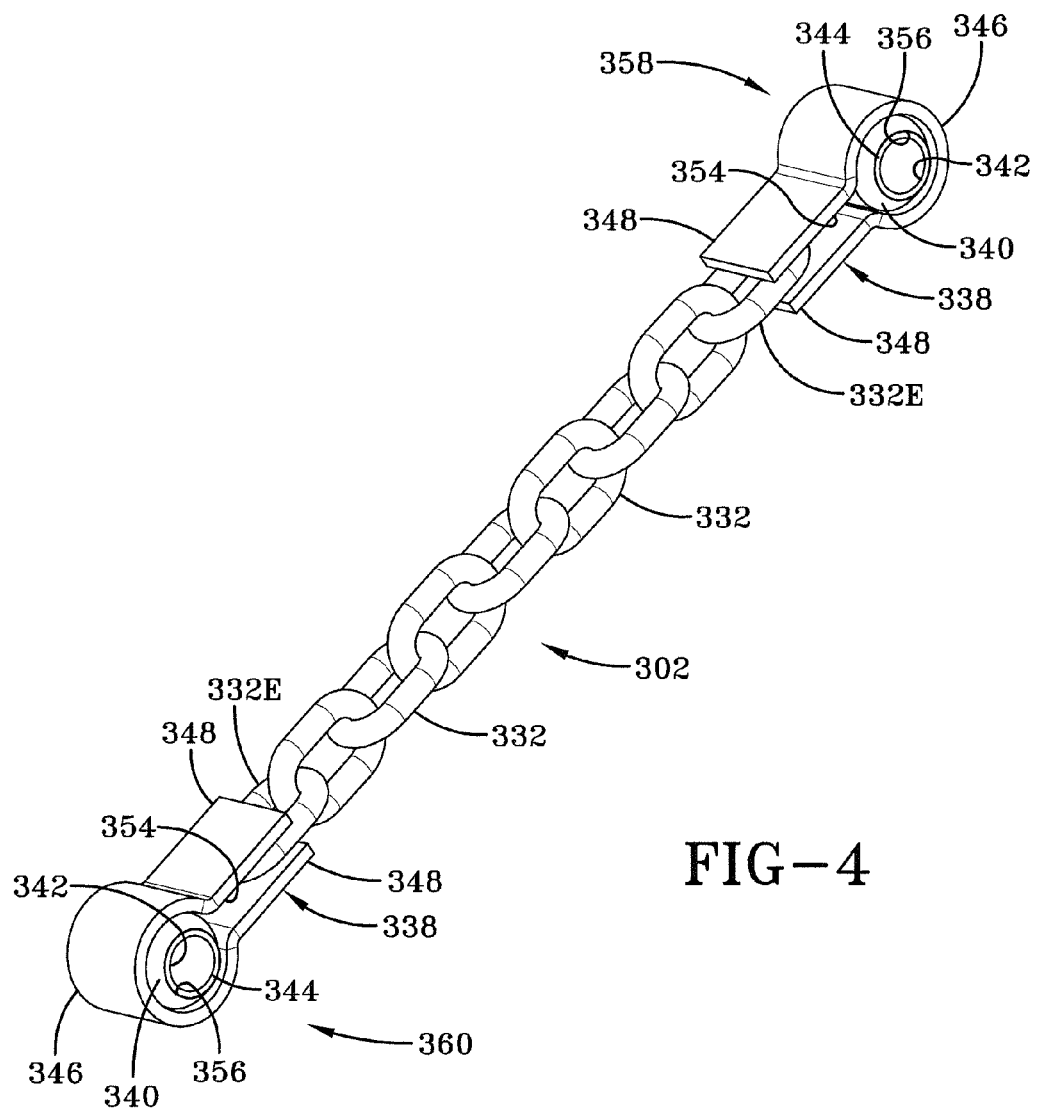
FIG. 4 is a perspective view of the first preferred embodiment mechanical stop of the present invention shown in FIG. 3 removed from the suspension assembly.
Figure 7:
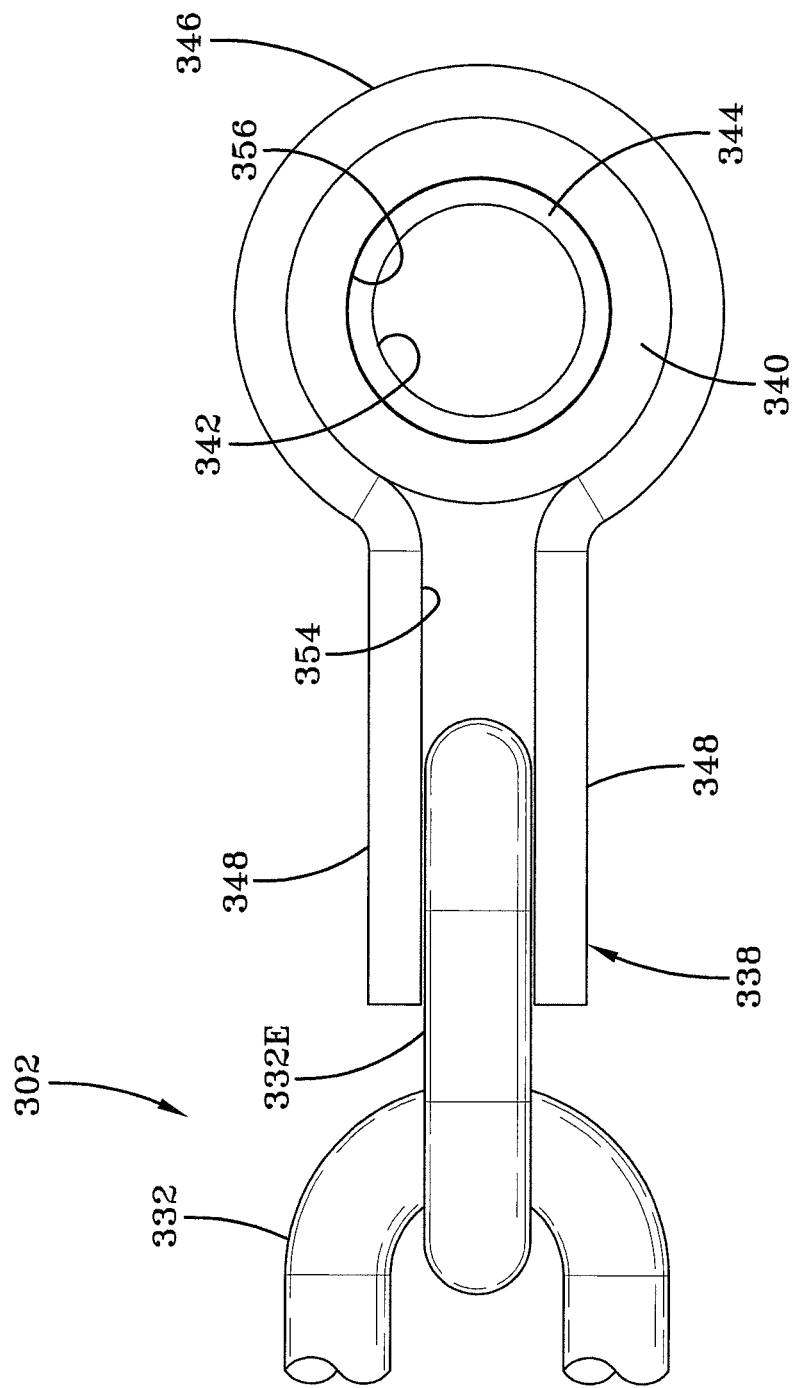
FIG. 7 is an enlarged fragmentary side view of an end of the first preferred embodiment mechanical stop of the present invention shown in FIG. 4, showing the generally U-shaped connector of the mechanical stop of the present invention attached to the links.
Figure 8:
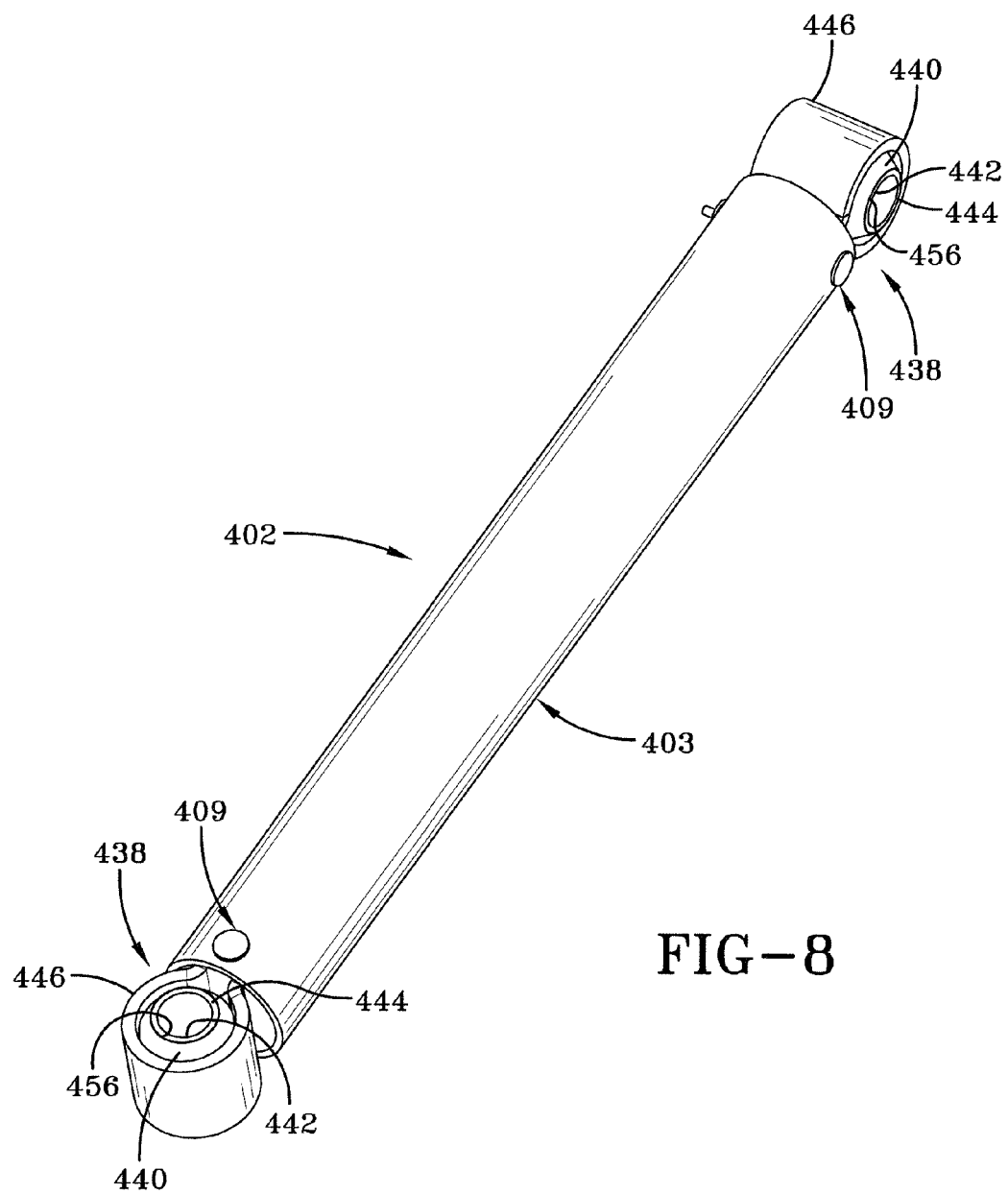
FIG. 8 is a top perspective view of a second preferred embodiment mechanical stop of the present invention for use with axle/suspension systems, showing the links of the mechanical stop enclosed by a semi-rigid sleeve.
Figure 9:
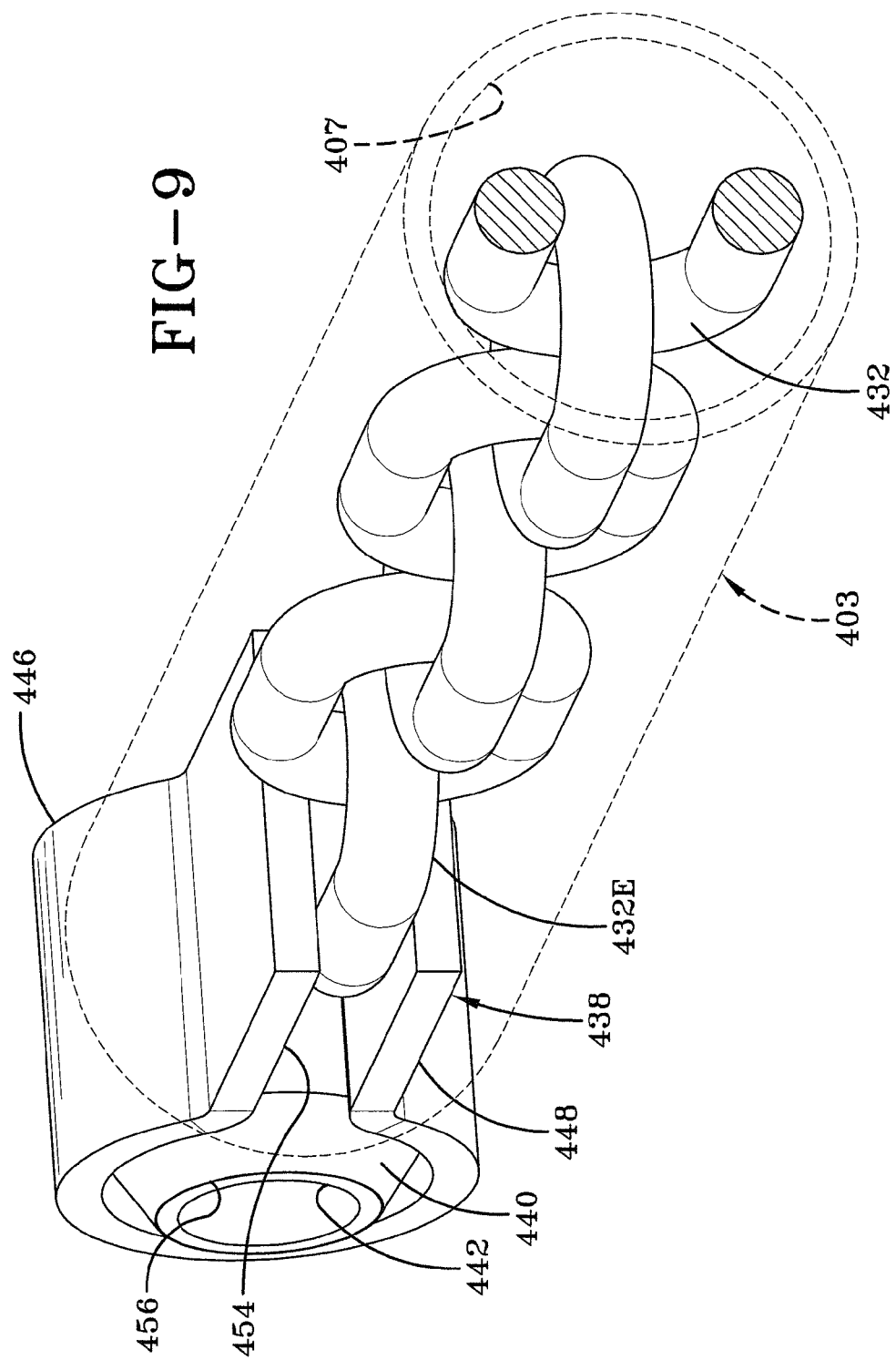
FIG. 9 is a cross-sectional cut-away view of the second preferred embodiment mechanical stop of the present invention, with hidden portions shown in ghost, showing a plurality of links enclosed by the semi-rigid sleeve.
Figure 10:
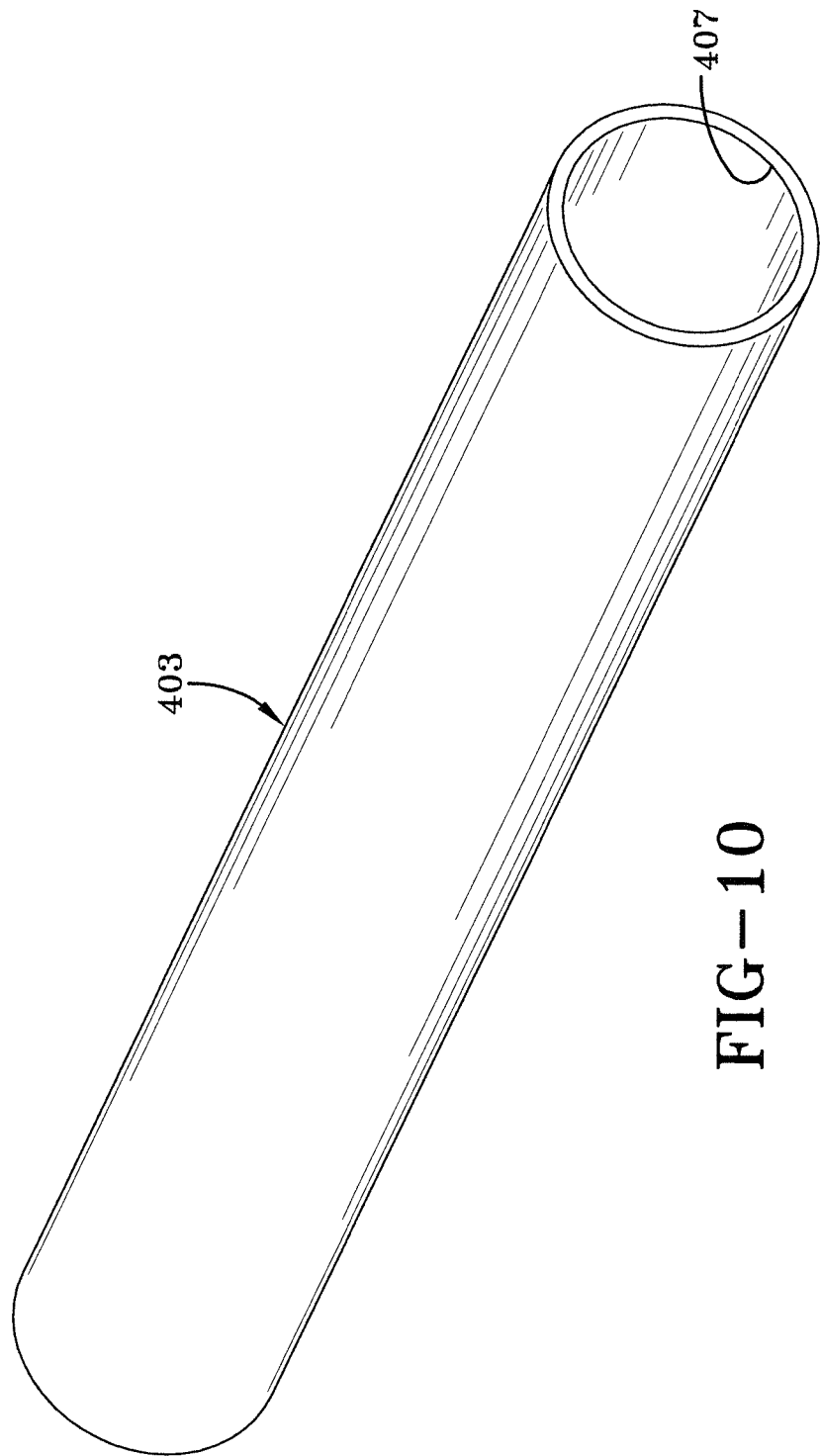
FIG. 10 is a perspective view of the semi-rigid sleeve of the second preferred embodiment mechanical stop of the present invention shown in FIG. 9, with the mechanical stop removed from the sleeve.

Turning now to FIG. 3, a first preferred embodiment mechanical stop 302 of the present invention is shown incorporated in a suspension assembly 300 of an axle/suspension system 301 (only portions shown). It is to be understood that axle suspension system 301 includes a pair of suspension assemblies 300, however, for sake of clarity only one of the suspension assemblies will be discussed below.

Suspension assembly 300 is pivotally connected to a hanger 304 via a trailing arm overslung beam 306. Beam 306 includes a pair of sidewalls 308 (only one shown), a front end 310, a rear end 312, a bottom plate 314, and a top plate 316. Beam 306 is pivotally connected to hanger 304 utilizing a bushing assembly 318 that includes an eccentric washer (not shown), a washer 320, a nut 322, and a bolt 324. Hanger 304 includes an inboardly extending wing 305 and it is to be understood that hanger 304 is part of the vehicle frame which further includes a main member 330 and at least a pair of cross members 331.

Rear end 312 of beam 306 is attached to a transversely extending axle 326 by welding or other rigid attachment. Air spring 328 is mounted on and extends between beam rear end 312 and main member 330 of the trailer (not shown).

It is important to note that axle/suspension system 301 has eliminated the shock absorber because damping is provided by air spring 328, as is discussed in more detail in U.S. Pat. No. 8,540,222, which is assigned to the same assignee as the present invention, Hendrickson USA, L.L.C. Suspension assembly 300 of axle/suspension system 301 utilizes mechanical stop 302 of the present invention, instead of shock absorbers, to limit the downward movement of beam 306 of the suspension assembly.

With additional reference to FIGS. 4-7, first preferred embodiment mechanical stop 302 of the present invention includes a plurality of interlocking links 332, and a pair of generally U-shaped connectors 338. Each connector 338 includes an elastomeric bushing 340, and an inner sleeve 344. Mechanical stop 302 of the present invention utilizes plurality of interlocking links 332 in order to provide strength and durability to the mechanical stop. It should be understood that other types of link materials and/or configurations could be utilized with mechanical stop 302 so long as they provide sufficient strength and durability in the environment underneath the trailer in which they are utilized.

More specifically, first preferred embodiment mechanical stop 302 of the present invention includes a pair of generally U-shaped connectors 338, but only one connector will be described below with the understanding that a generally identical connector is attached to the opposite end of the mechanical stop. U-shaped connector 338 includes a generally semi-circular portion 346 and a pair of generally elongated spaced-apart parallel portions 348. Elongated portions 348 extend from generally semi-circular portion 346 so that a space 354 is created between the elongated portions. End link 332E of mechanical stop 302 of the present invention is centrally disposed into space or slot 354 between elongated portions 348 of U-shaped connector 338 and is attached therein by a rigid means of attachment, such as welds or other fastening means. Rigid attachment of end links 332E to U-shaped connectors 338 generally minimizes and controls the movement tolerance of plurality of links 332, and further controls a distance between the U-shaped connectors. Additionally, the distance between the centerlines of U-shaped connectors 338 is controlled by the rigid attachment of end links 332E. The centerline of U-shaped connector 338 is defined as the central axis of inner sleeve 344. More specifically, a range of movement tolerance of plurality of links 332 is minimized from a range of about 0.2 inches to about 0.3 inches for each of the links, as in the prior art, to a range of from about 0.0 inches to about 2.0 inches, preferably to a range of from about 0.0 inches to about 1.25 inches, most preferably to a range of from about 0.0 inches to about 0.5 inches, and even more preferably to a range of from about 0.0 inches to about 0.15 inches, irrespective of the number of links in mechanical stop 302. In this manner, the range of tolerance of plurality of links 332 and rigid attachment of end links 332E limits the downward movement of beam 306 of the suspension assembly to minimize potential damage to air spring 328 due to overextension of the air spring. In addition, the range of movement tolerance of plurality of links 332 and rigid attachment of end links 332E minimizes the possibility of failure of the plurality of links and/or U-shaped connector 338. The connection of each link 332E to its respective elongated portion 348, and thus reduction in movement tolerance, facilitates the transfer of forces to suspension assembly 300, as will be described in more detail below.

Semi-circular portion 346 of generally U-shaped connector 338 generally encircles elastomeric bushing 340. Elastomeric bushing 340 is preferably composed of rubber, but may include other elastomeric compositions or may include some other member of compliance, such as a spring, and is generally cylindrical in shape. Elastomeric bushing 340 includes a continuous centrally-formed opening 356. Cylindrical inner sleeve 344 is disposed in opening 356 by press fit or other connection type, such as adhesive. Elastomeric bushing 340 is in turn generally press-fit into semi-circular portion 346 of connector 338. Inner sleeve 344 facilitates connection of stop 302 to suspension assembly 300 of axle/suspension system 301, as will be described below. Elastomeric bushing 340 generally extends beyond U-shaped connector 338, as shown in FIG. 5.

Having described the general structure of first preferred embodiment mechanical stop 302 of the present invention, the installation of the mechanical stop onto axle suspension system 301 will now be described in detail below.

A top end 358, or first end, of mechanical stop 302 of the present invention is connected to hanger 304 utilizing a clevis-type mounting bracket 334 (FIG. 3). Mounting bracket 334 is rigidly attached to wing 305 of hanger 304, by welds or other means of rigid attachment. A fastener 336 attaches generally U-shaped connector 338 of mechanical stop 302 to mounting bracket 334 of hanger wing 305. More particularly, fastener 336 is disposed through aligned openings (not shown) formed in mounting bracket 334 and opening 342 formed in inner sleeve 344.

Bottom end 360, or second end, of mechanical stop 302 is rigidly attached to beam rear end 312, adjacent to axle 326, utilizing a generally U-shaped mounting bracket 350 and a bolt 352, or by other similar means of rigid attachment. Bolt 352 attaches generally U-shaped connector 338 of mechanical stop bottom end 360 to mounting bracket 350. Bolt 352 is disposed through opening 342 formed in inner sleeve 344, through an opening (not shown) formed in mounting bracket 350, and through beam 306.

Having now described the structure and installation of first preferred embodiment mechanical stop 302 of the present invention, the operation of the mechanical stop will be described below. When beam 306 of suspension assembly 300 of axle/suspension system 301 moves downwardly, links 332 of mechanical stop 302 of the present invention fully extend, limiting the downward movement of the beam and preventing air spring 328 from overextending and thus minimizing the possibility of damage to the air spring and the axle/suspension system. Once fully extended, mechanical stop 302 of the present invention transfers the force to U-shaped connector 338. More specifically, as beam 312 moves downwardly, end link 332E of bottom end 360 pulls against the end link of top end 358 and respective elastomeric bushings 340 generally encircled by U-shaped connector each temporarily deform to absorb the force prior to transfer of the force to hanger 304 and beam 306. Each elastomeric bushing 340 is temporarily deformed as a result of the transfer of force from semi-circular portion 346. Without the temporary deformation of elastomeric bushing 340, transfer of the force would generally be isolated to links 332, and may potentially cause the links to separate and/or cause damage to brackets 334, 350, beam 306, or hanger 304.

The use of first preferred embodiment mechanical stop 302 of the present invention reduces the weight of suspension assembly 300 as compared to utilizing prior art shock absorbers 40, 207A,B to limit the downward extension of the axle/suspension system. Moreover, the use of mechanical stop 302 of the present invention is less complex than prior art shock absorbers 40, 207A,B, thus minimizing costly repairs and/or maintenance costs associated with the prior art shock absorbers. Even further, mechanical stop 302 of the present invention limits the downward movement of beam 306 of suspension assembly 300 of axle/suspension system 301 to minimize potential damage to air spring 328 and/or the axle/suspension system.

With additional reference to FIGS. 8-11, a second preferred embodiment mechanical stop 402 for axle/suspension systems of the present invention is shown. Second preferred embodiment mechanical stop 402 is similar in structure to first preferred embodiment mechanical stop 302, but further includes a flexible protective sleeve 403 to minimize movement of a plurality of links 432 of the mechanical stop.

Second preferred embodiment mechanical stop 402 includes a pair of generally U-shaped connectors 438, but only one connector will be described below with the understanding that a generally identical connector is attached to the opposite end of the mechanical stop. U-shaped connector 438 includes a generally semi-circular portion 446 and a pair of generally elongated spaced-apart parallel portions 448. Elongated portions 448 extend from generally semi-circular portion 446 so that a space 454 is created between the elongated portions. End link 432E of mechanical stop 402 is centrally disposed into space or slot (not shown) between elongated portions 448 of U-shaped connector 438 and is attached therein by a rigid means of attachment, such as welds or other fastening means. Rigid attachment of each end link 432E to its respective U-shaped connector 438 generally minimizes and controls the movement tolerance of plurality of links 432, and further controls a distance between the U-shaped connectors. Additionally, the distance between the centerlines of U-shaped connectors 438 is controlled by the rigid attachment of end links 432E. The centerline of U-shaped connector 438 is defined as the central axis of inner sleeve 444. More specifically, a range of movement tolerance of plurality of links 432 is minimized from a range of about 0.2 inches to about 0.3 inches for each of the links, as in the prior art, to a range of from about 0.0 inches to about 2.0 inches, preferably to a range of from about 0.0 inches to about 1.25 inches, most preferably to a range of from about 0.0 inches to about 0.5 inches, and even more preferably to a range of from about 0.0 inches to about 0.15 inches, irrespective of the number of links in the mechanical stop 402. In this manner, the range of tolerance of plurality of links 432 and rigid attachment of end links 432E limits the downward movement of beam of the suspension assembly to minimize potential damage to air spring (not shown) due to overextension of the air spring. In addition, the range of movement tolerance of plurality of links 432 and rigid attachment of end links 432E minimizes the possibility of failure of the plurality of links and/or U-shaped connector 438. The connection of each end link 432E to its respective elongated portion 448, and thus reduction in movement tolerance, facilitates the transfer of forces to suspension assembly, as will be described in more detail below.

Semi-circular portion 446 of generally U-shaped connector 438 generally encircles elastomeric bushing 440. Elastomeric bushing 440 is preferably composed of rubber, but may include other elastomeric compositions or may include some other member of compliance, such as a spring, and is generally cylindrical in shape. Elastomeric bushing 440 includes a continuous centrally-formed opening 456. A cylindrical inner sleeve 444 is disposed in opening 456 by press fit or other connection type, such as adhesive, and inner sleeve includes an opening 442. Elastomeric bushing 440 is in turn generally press-fit into semi-circular portion 446 of connector 438. Inner sleeve 444 facilitates connection of stop 402 to suspension assembly of axle/suspension system as described in first embodiment mechanical stop 302.

Figure 11:
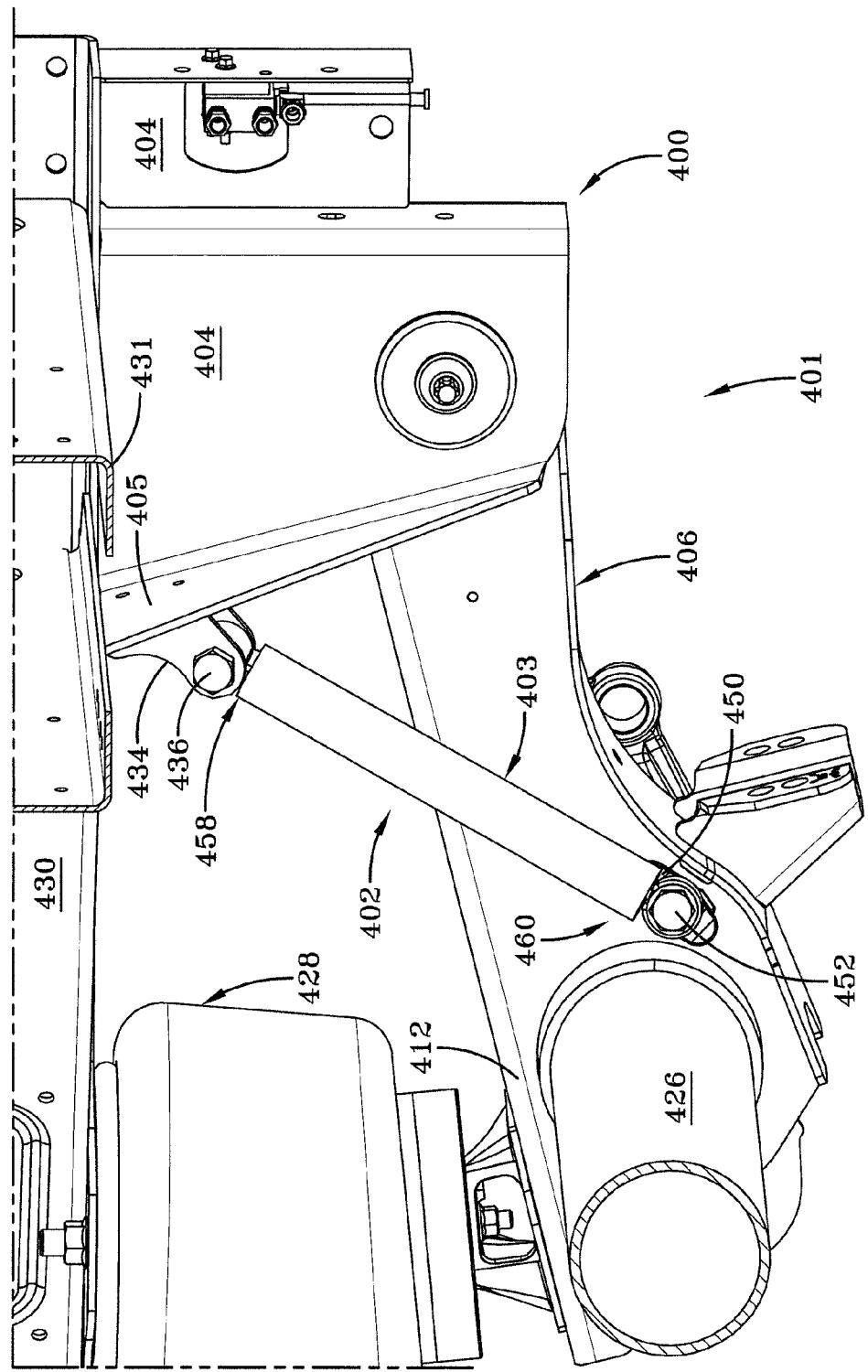
FIG. 11 is a fragmentary perspective view in the outboard direction, of portions of a driver-side suspension assembly of an axle/suspension system incorporating the second preferred embodiment mechanical stop of the present invention.

An important aspect of second preferred embodiment mechanical stop 402 is flexible sleeve 403. Sleeve 403 may be composed of a durable material, such as a composite, form-fitting rubberized coating, or other flexible covering. Sleeve 403 is formed with an opening 407 through which links 432 are disposed to enclose or encase and minimize the movement of the links. Further, sleeve 403, which may be in a single piece or with a seam, is generally cylindrical in shape and generally extends the length of links 432 to limit the movement of the links. More specifically, sleeve 404 limits lateral movement, vertical movement, and crimping movement as well as other potentially detrimental movements of links 432. The limited movement of links 432 in turn minimizes the impact of the links upon the beam 406 of the axle/suspension system 401 and prolongs the product life of second embodiment mechanical stop 402 (FIG. 11). Optionally, a pin assembly 409 (FIG. 8) may be included in second preferred embodiment mechanical stop 402 to limit the movement of plurality of links 432 prior to installation of the mechanical stop. It is contemplated that pin assembly 409 may include other fasteners, such as a bolt and nut, to limit the movement of plurality of links 432. Additionally, it is contemplated that pin assembly 409 may remain connected after installation.

A top end 458 of mechanical stop 402 of the present invention is connected to a hanger 404 utilizing a clevis-type mounting bracket 434. It is to be understood that hanger 404 is part of the vehicle frame which further includes a main member 430 and at least a pair of cross member 431. Mounting bracket 434 is rigidly attached to a wing 405 of hanger 404, by welds or other means of rigid attachment. A fastener 436 attaches generally U-shaped connector 438 of mechanical stop 402 to mounting bracket 434 of hanger wing 405. More particularly, fastener 436 is disposed through aligned openings (not shown) formed in mounting bracket 434 and opening 442 formed in inner sleeve 444.

A bottom end 460 of mechanical stop 402 is rigidly attached to a beam rear end 412, adjacent to an axle 426, utilizing a generally U-shaped mounting bracket 450 and a bolt 452, or by other similar means of rigid attachment. Bolt 452 attaches generally U-shaped connector 438 of mechanical stop bottom end 460 to mounting bracket 450. Bolt 452 is disposed through opening 442 formed in inner sleeve 444, through an opening (not shown) formed in mounting bracket 450, and through beam 406.

The use of second preferred embodiment mechanical stop 402 of the present invention reduces the weight of a suspension assembly 400 as compared to utilizing prior art shock absorbers 40, 207A,B to limit the downward extension of the axle/suspension system. Moreover, the use of mechanical stop 402 of the present invention is less complex than prior art shock absorbers 40, 207A,B, thus minimizing costly repairs and/or maintenance costs associated with the prior art shock absorbers. Even further, mechanical stop 402 of the present invention limits the downward movement of beam 406 of suspension assembly 400 of an axle/suspension system 401 to minimize potential damage to an air spring 428 and/or the axle/suspension system. Air spring 428 is mounted at one end to main member 430.

It is to be understood that top end 358, 458 of mechanical stop 302, 402 could be rigidly attached to other portions of hanger 304, 404 or other portions of the vehicle frame, such as main members 330, 430 and cross members 331, 431, respectively, and the like. Additionally, it is contemplated that mechanical stop 302, 402 may include an elastomeric bushing 340, 440 at one end and another connection type at the opposite end, or alternatively, another non-bushing connection type at both ends.

Accordingly, the mechanical stop for axle/suspension systems is simplified, provides an effective, safe, inexpensive and efficient structure and method which achieves all the enumerated objectives, provides for eliminating difficulties encountered with prior art axle/suspension systems utilizing shock absorbers, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the mechanical stop for axle/suspension systems of the present invention is used and installed, the characteristics of the construction, arrangement and method steps, and the advantageous, new and useful results obtained; the new and useful structures, devices, elements, arrangements, processes, parts and combinations are set forth in the appended claims.

What is claimed is:

1. An axle/suspension system for a heavy-duty vehicle having a frame and at least one suspension assembly operatively connected to said frame, said axle/suspension system including:
   a mechanical stop having a plurality of links and a first end and a second end, said second end rigidly attached to said suspension assembly and said first end rigidly attached to the vehicle frame, wherein the first end and the second end control a distance between said first end and said second end, and control said plurality of links to attain a movement tolerance range of said mechanical stop from 0.0 inches to 2.0 inches.

2. The axle/suspension system for heavy-duty vehicles of claim 1, said first end and said second end control said plurality of links to attain a movement tolerance range of from 0.0 inches to 1.25 inches.

3. The axle/suspension system for heavy-duty vehicles of claim 1 said first end and said second end control said plurality of links to attain a movement tolerance range of from 0.0 inches to 0.5 inches.

4. The axle/suspension system for heavy-duty vehicles of claim 1, said first end and said second end control said plurality of links to attain a movement tolerance range of from 0.0 inches to 0.15 inches.

5. The axle/suspension system for heavy-duty vehicles of claim 1 further including a sleeve surrounding said mechanical stop.

6. The axle/suspension system for heavy-duty vehicles of claim 5, said sleeve composed of rubber.

7. The axle/suspension system for heavy-duty vehicles of claim 5, said sleeve composed of a composite.

8. The axle/suspension system for heavy-duty vehicles of claim 5, said sleeve composed of a form-fitting coating.

9. The axle/suspension system for heavy-duty vehicles of claim 1, wherein said first end and said second end comprises a connector with a bushing.

10. The axle/suspension system for heavy-duty vehicles of claim 9 wherein said connector is generally U-shaped.

11. The axle/suspension system for heavy-duty vehicles of claim 10, said connector further includes a pair of elongated portions and a semi-circular portion.

12. The axle/suspension system for heavy-duty vehicles of claim 11, wherein a chain connects said first end and said second end.

13. The axle/suspension system for heavy-duty vehicles of claim 12 wherein an end link of said chain is disposed into a space between said pair of elongated portions.

14. The axle/suspension system for heavy-duty vehicles of claim 13, wherein said connector further includes an elastomeric bushing and an inner sleeve.

15. The axle/suspension system for heavy-duty vehicles of claim 1, wherein said first end of said mechanical stop is attached to a component of the vehicle frame, said component selected from the group consisting of a hanger, a main member, or a cross member.

16. The axle/suspension system for heavy-duty vehicles of claim 15 that further includes said second end of said mechanical stop rigidly attached to a beam of said suspension assembly, adjacent an axle.

17. An axle/suspension system for a heavy-duty vehicle having a frame and at least one suspension assembly operatively connected to said frame, said axle/suspension system including:

a mechanical stop having a first end and a second end, said second end rigidly attached to said suspension assembly and said first end rigidly attached to the vehicle frame, wherein at least one of said first end and said second end comprises a connector with a bushing, said system being free of shock absorbers.

18. An axle/suspension system for a heavy-duty vehicle having a frame and at least one suspension assembly operatively connected to said frame, said axle/suspension system including:

a mechanical stop having a plurality of links and a first end and a second end, said second end rigidly attached to said suspension assembly and said first end rigidly attached to the vehicle frame, wherein the first end and the second end control a distance between said first end and said second end, and control said plurality of links to attain a movement tolerance range of said mechanical stop from 0.0 inches to 2.0 inches, wherein said first end and said second end comprises a connector with a bushing.

19. The axle/suspension system for heavy-duty vehicles of claim 18 wherein said connector is generally U-shaped.

20. The axle/suspension system for heavy-duty vehicles of claim 19, said connector further includes a pair of elongated portions and a semi-circular portion.

21. The axle/suspension system for heavy-duty vehicles of claim 20, wherein a chain connects said first end and said second end.

22. The axle/suspension system for heavy-duty vehicles of claim 21 wherein an end link of said chain is disposed into a space between said pair of elongated portions.

23. The axle/suspension system for heavy-duty vehicles of claim 22, wherein said connector further includes an elastomeric bushing and an inner sleeve.

\* \* \* \* \*